Jan. 2, 1923.  1,440,364
C. K. APPLEBY.
CALCULATOR.
FILED AUG. 13, 1921.
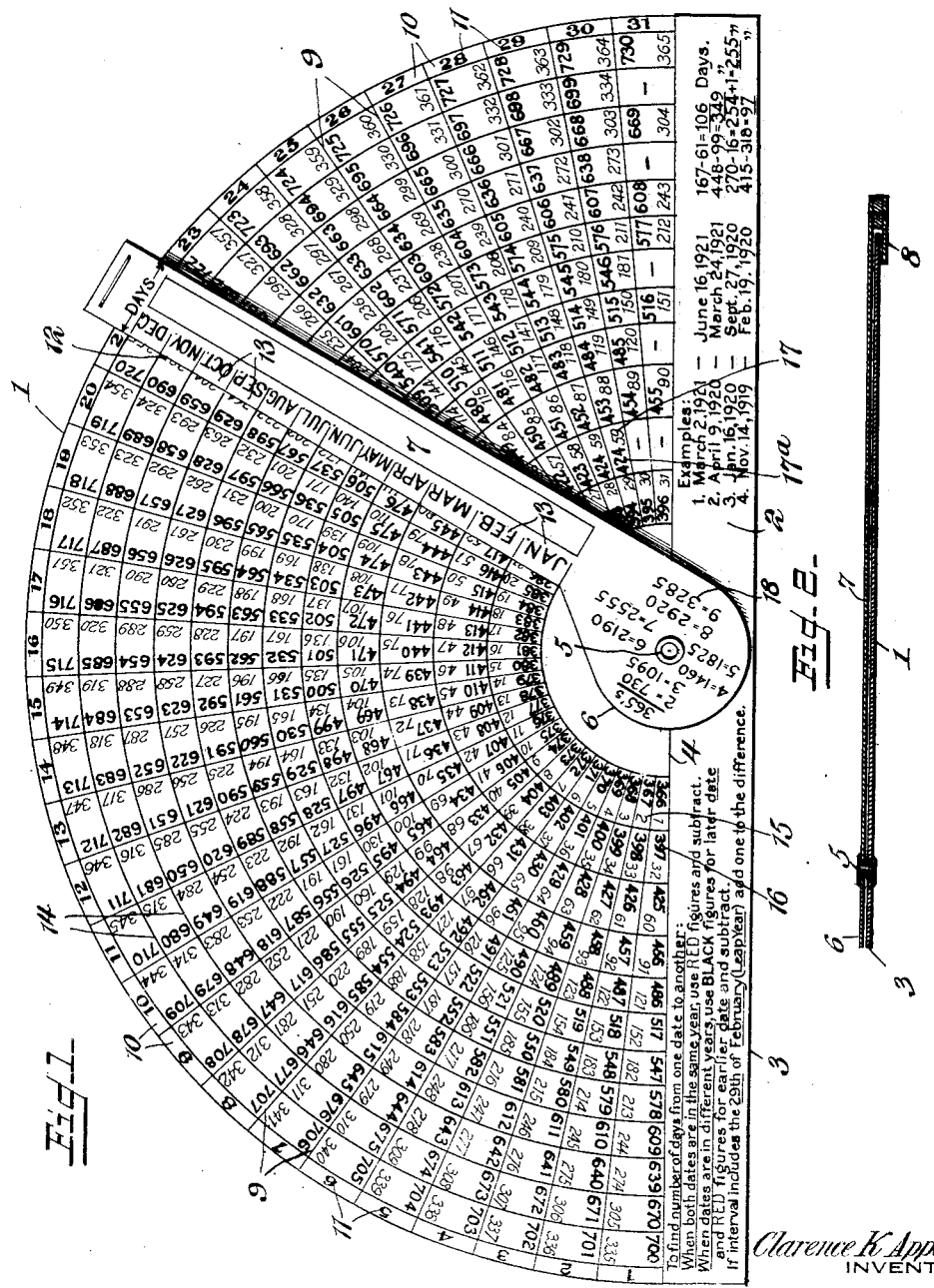

Patented Jan. 2, 1923.

1,440,364

UNITED STATES PATENT OFFICE.

CLARENCE KINGSBURY APPLEBY, OF PROVIDENCE, RHODE ISLAND.

CALCULATOR.

Application filed August 13, 1921. Serial No. 492,057.

*To all whom it may concern:*

Be it known that I, CLARENCE K. APPLEBY, a citizen of the United States, residing at Providence, in the county of Providence and State of Rhode Island, have invented a new and useful Calculator, of which the following is a specification.

This invention has reference to calculators, and its object is to provide a calculator chart provided with tables of numbers, and with instrumentalities, by means of which the elapsed time between two determined dates, may be accurately and quickly ascertained, with the chance of error practically eliminated.

In a simple form, although the invention is not confined to such particular form, the chart comprises a segment, comprising somewhat more than a half circle, in extent, and formed of cardboard, celluloid, aluminum or other material, having secured to it at its center, an arm capable of swinging through an arc of 180°. The arm has one edge radial to its axis of movement and the other edge tangential to said axis by a determined distance, the base of the segmental chart being on a line also tangential to the center of generation of the chart by a like distance, so that the diameter of the chart, considering it as a segmental chart, is spaced from the base of the chart to an extent approximately that of the width of the arm.

On the face of the chart there are imprints including radial lines defining a number of narrow segmental divisions corresponding to the days of a long or thirty-one day month, and about the center of the chart there are produced arcs, in number corresponding to the months of the year, that is, twelve. In the spaces defined by the arcs there are arcuate rows of figures in consecutive accumulating order, with the total number reaching twice 365, (representative of the number of days in the year,) such accumulation reaching a total value of two years.

About the periphery of the chart the segments between the radial lines represent the days of a long month. Such a chart may represent, by the numbers imprinted thereon, a total elapsed time of two years, or 730 days, with the days of one year printed in a contrasting manner to those of the other year, so that the chart may be utilized for ascertaining the elapsed time, either between two dates in one year, or two dates in two years, and in order to facilitate such calculations, the figures representing the days of one year may be printed in one color, say red, and the days of the second year may be printed in black, or any other suitable arrangement may be followed.

The invention will be best understood from a consideration of the following detailed description taken in connection with the accompanying drawing forming part of this specification, with the understanding, however, that the invention is not confined to any strict conformity with the showing of the drawing, but may be changed and modified, so long as such changes and modifications mark no material departure from the salient features of the invention as expressed in the appended claims.

In the drawings:

Fig. 1 is a plan view of the chart embodying the invention.

Fig. 2 is a radial section through the chart shown in Fig. 1, along the line of the indicating arm thereof.

Referring to the drawing, there is shown a chart 1, which may be of any suitable shape, but in the drawing is shown of approximately semi-circular form, with the diametric portion widened, as indicated at 2, so that the center or axis of the curved portion of the chart is spaced from the base of the chart, indicated at 3, by the space representing a material distance from the diameter of the chart, indicated at 4, and in which diameter, there is located a pivot 5, central to an enlarged end 6 of an arm 7, of a width corresponding to the width of the space 2, the arm 7 being tangential to the pivot 5.

The outer end of the arm 7 projects beyond the outer edge or periphery of the chart 1, and is returned about said edge, as shown at 8 in Fig. 2, so that the arm 7 may be swung about the pivot 5, with the return end 8 so embracing the margin of the chart that the arm is held to the chart in a manner to prevent the outer or free end of the arm from being lifted away from the chart.

The face of the chart is divided by a series of radial lines 9 into segmental spaces in number corresponding to the days of a month of thirty-one days, and in spaces or boxes 10 at the marginal portion of the chart, are numbers 11, running consecutively from 1 to 31.

The arm 7 is divided along a radial edge 12 into boxes 13 containing in order, the names of the calendar months. The boxes 13 correspond in length to the spaces between parallel arc-shaped lines 14, described about the axis in which the pivot 5 is located, and as the arm 7 is swung about the pivot 5, the edge 12 may be brought into coincidence with any one of the radial lines 9.

The face of the chart is, in the particular showing of the drawing, provided with a curved series 15 of numbers adjacent to the lines 14, and with other curved series 16 of numbers, adjacent to the neighboring lines 14, so that on each side a line 14, there are two curved series of numbers 15 and 16, made contrasting by characteristically different imprints. For instance, the numbers 15 may be all printed in red, while the numbers 16 are all printed in black, or some other characteristic differentiation may be employed.

The innermost half circle of numbers 15 may represent the days of the month of January, which numbers total thirty-one. The next outer row of red numbers represents the days of February, but this month is a variable one in its number of days, which during certain years total twenty-eight days and at an intermediate year (leap year), totals twenty-nine days. Consequently, in the curved row of figures representing the month of February, there are two numbers alike. The sum total of the full complement in days of the month of January is thirty-one, and when twenty-eight days are added for the month of February, the total for the two months equals fifty-nine, but, to allow for leap year, two numbers 59 are printed, permitting the occasional adding of an extra day for leap year, without affecting the sum total of days between two chosen dates when no leap year occurs. This scheme avoids any disarrangement by the interpolation of the leap year.

The same arrangement is provided for the second year indication on the chart, where the numbers, in the particular showing of the drawings, are differentiated by the use of black-face numbers, and in the same column containing the February numbers 17 are other similar numbers 17ª. In like manner, the numbers 15 and 16 are continued through the face of the chart 1, so that the entire chart, in the particular showing of the drawings, will cover a period of two years.

On the inner or basic end of the arm 7, is a table showing, year by year, the sum total of the days of the several years up to nine years, wherefore, while the elapsed time between two dates in one or two consecutive years may be readily ascertained by subtraction, the elapsed time between two dates extending over a period greater than two years, is as easily ascertained by the same procedure, with an addition of appropriate numbers represented in a table 18, which may be printed on the basic portion of the swinging arm 7.

By way of example, let it be assumed that it is desired to ascertain the elapsed time between March 2, 1921, and June 16, 1921. By moving the arm 7 until the edge 12 is along the radial line to the right of the box 10 having the number 2 and then ascertaining the arc-shaped space corresponding to the designation March, it will be found that the red ink number there located is 61. Now, turning the arm 7 until the day number 16 is reached, and tracing along the arm to the month designation June, the red ink number shown along the radial column corresponding to the sixteenth of June, is 167. Then, subtracting 61 from 167, the elapsed time is 106 days.

Suppose, however, that the earlier date is April 9, 1920, and the later date is March 24, 1921. This means that the two dates occur in different years. In like manner, then, by referring to the red ink date for the earlier date, and the black ink date for the later date, because it occurs in a succeeding year, the two numbers to be subtracted are 99 from 448, leaving 349 days between the two dates. Should the 29th of February occur between the two dates, the elapsed time is ascertained by adding one day.

The table 18 is particularly useful in figuring return premiums of an insurance policy cancelled pro rata. If the unearned time is 243 days and the premium is $100.00 the amount to be returned will be $\frac{243}{365}$ of $100.00 or $\frac{24300}{365}$, and by reference to table 18 it is readily ascertained how many times 365 will go into 2430, or 6, and so on, thus saving much time in figuring and increasing the accuracy of such computation.

These examples are believed to be sufficient to show the working of the chart, and further examples are unnecessary. If the two dates are separated by more than two years, the numbers of days in the extra years are easily ascertained by consulting the table 18.

By extending the card below the space occupied by the instructions and examples, room is provided for advertising and other purposes, and to prevent the arm 7 from running off from the chart and thereby become liable to injury. The rear face of the card or chart may be used for other data, not shown on the drawings. Furthermore, the chart or card may be rectangular or other form instead of segmental shape.

What is claimed is:—

1. A calculator comprising a chart having associated spaces thereon with each of the spaces provided with two sets of figures, one set representing, progresively, the total number of days of the year and the other set of figures representing, consecutively, the days of a succeeding year and designated in correspondingly higher order, whereby the included number of days between a chosen date in one year and another chosen date in the succeeding year may be readily ascertained without liability of error.

2. A calculator comprising a chart having associated spaces thereon with each of the spaces provided with two sets of figures, one set representing, progressively, the total number of days of the year, and the other set of figures representing, consecutively, the days of a succeeding year and designated in correspondingly higher order, whereby the included number of days between a chosen date in one year and another chosen date in the succeeding year may be readily ascertained without liability of error, said chart including a movable member with monthly indications thereon, and the primary and higher order of numbers on the chart to designate the days of the succeeding year being characteristically differentiated for ready distinction.

3. A calculator of the character described comprising a body inscribed with a series of semi-circular concentric lines defining twelve semi-circular areas, the body being further inscribed with a series of radial lines intersecting the first named lines and dividing the sheet into thirty-one sector shaped columns corresponding to the maximum number of days in a month, each column made up of twelve boxes or spaces, the sheet being inscribed outwardly of the outermost semi-circular line with numerals corresponding to the columns and ranging from 1 to 31, the blocks or spaces commencing at the innermost columns being each inscribed with two sets of figures, one set representing progressively the total number of days of the year from 1 to 365 and the other set reading from 366 to 730 progressively, representing the days of a second year, said two series of numbers being printed contrastingly so as to be readily distinguishable, and an arm pivoted at the center of said concentric lines and having a radial edge graduated to correspond with the columns and inscribed with the names of the months.

4. A calculating device comprising a sheet inscribed with a series of lines defining twelve spaces intersected by other lines defining thirty-one columns, thereby making thirty-one columns of twelve spaces each, the spaces commencing at the innermost row being inscribed with figures ranging from 1 to 365 increasing progressively for each space, and said spaces being also inscribed with a second series of numbers equalling the number of days in a second year plus the adjacent number of the first named series, the sheet being inscribed at the outer ends of the radial columns with numbers ranging from 1 to 31, and a movable member divided into spaces corresponding to the spaces on the sheet and inscribed with the names of the months.

In testimony, that I claim the foregoing as my own, I have hereto affixed my signature.

CLARENCE KINGSBURY APPLEBY.